United States Patent [19]

Takada et al.

[11] Patent Number: 5,395,297
[45] Date of Patent: Mar. 7, 1995

[54] AUTOMATIC TOOL CHANGE SYSTEM IN COMBINED MACHINING LATHE

[75] Inventors: Hiroshi Takada; Hidetaka Shibata; Toshiaki Oguchi; Yukihiro Aono, all of Niwa, Japan

[73] Assignee: Okuma Corporation, Aichi, Japan

[21] Appl. No.: 241,991

[22] Filed: May 12, 1994

[30] Foreign Application Priority Data

May 13, 1993 [JP] Japan .................. 5-136657

[51] Int. Cl.⁶ .................................. B23Q 3/157
[52] U.S. Cl. ........................... 483/25; 483/62
[58] Field of Search .................. 483/24, 25, 62

[56] References Cited

U.S. PATENT DOCUMENTS

| | | | |
|---|---|---|---|
| 3,691,626 | 9/1972 | Mousseau et al. | 483/62 X |
| 4,335,500 | 6/1982 | Munekata et al. | 483/62 X |
| 4,577,389 | 3/1986 | Shultz | 483/25 X |

FOREIGN PATENT DOCUMENTS

| | | | |
|---|---|---|---|
| 62-251040 | 10/1987 | Japan . | |
| 0074507 | 4/1988 | Japan | 483/24 |
| 0009502 | 1/1990 | Japan | 483/24 |

Primary Examiner—Z. R. Bilinsky
Attorney, Agent, or Firm—Dickstein, Shapiro & Morin

[57] ABSTRACT

In an automatic tool change system in a combined machining lathe, with rotational and planar movements of a tool change arm, tools are replaced with each other between magazine pots and first and second tool holders which are mounted to a turret so as to be directed to a rotation axis direction of the turret and to a rotation plane direction of the turret, respectively. A tool grasp part of the tool change arm includes first holding claws for inserting and withdrawing a tool into and from the first tool holder and second holding claws for inserting and withdrawing a tool into and-from the second tool holder. At a tool exchange position, each magazine pot is pivoted between a first exchange position where the magazine pot takes an attitude parallel to the first tool holder and a second exchange position where the magazine pot takes an attitude face to face with the second tool holder. The light-weight tool change arm having a simple configuration can be provided and a quick tool exchange operation can be performed.

4 Claims, 7 Drawing Sheets

AUTOMATIC TOOL CHANGE SYSTEM IN COMBINED MACHINING LATHE

BACKGROUND OF THE INVENTION i) Field of the Invention:

The present invention relates to an automatic tool change system in a combined machining lathe, said system having a tool change arm for replacing tools between a turret and a tool magazine.

ii) Description of the Related Arts:

Conventionally, in a combined machining lathe, a turret often includes a first tool holding means for receiving a tool in a direction of the turret's rotation and a second tool holding means for receiving a tool in a direction of the turret's rotation plane. Hence, a tool change arm of an automatic tool change system is required to mount and demount the tools in the two different directions. For this purpose, one conventional automatic tool change system has been developed, as disclosed in Japanese Patent Laid-Open No. Sho 62-251040. In this system, as shown in FIGS. 7A and 7B, a tool change arm 101 has an L-shaped holding claw 102 rotatable around a rotation axis 103 inclined at an angle of 45° with respect to a rotation axis 105 of a turret 104. When rotating 180° around the rotation axis 103, the holding claw 102 can take an attitude where the holding claw 102 can insert or fit a tool into a first tool holding means 106 of the turret 104 (FIG. 7A) and an attitude where the holding claw 102 can insert or fit a tool into a second tool holding means 107 of the turret 104 (FIG. 7B). Hence, the tool change arm 101 meets the requirement of mounting and demounting of the tools into and out of the holding means of the two different directions.

In this conventional automatic tool change system, however, the tool change arm is required to have a mechanism for rotating the holding claw, and oil hydraulics for opening or closing the holding claw is supplied through a rotational part. As a result, its construction becomes complicated and its weight increases.

SUMMARY OF THE INVENTION

It is therefore an object of the present invention to provide an automatic tool change system in a combined machine lathe in which a tool change arm has a simple configuration and is reduced in weight.

In order to achieve this object, in accordance with one aspect of the present invention, there is provided an automatic tool change system in a combined machining lathe having a turret for holding tools, comprising: a plurality of magazine pots for insertably and withdrawably holding tools to be mounted onto the turret; a tool magazine for indexing the magazine pots to a tool exchange position; tool grasp means for inserting and withdrawing the tools into and from first and second tool holding means which are mounted to the turret so as to be directed to a rotation axis direction of the turret and to a rotation plane direction of the turret, respectively; and a tool change arm which is rotatable so as to rotatably move the tool holding means around an axis parallel to the rotation axis of the turret and is movable in a planar direction, the tool change arm replacing the tools between the magazine pots and the first tool holding means and between the magazine pots and second tool holding means through the rotational and planar movements of the tool change arm, wherein the tool grasp means includes first grasp claw means for inserting and withdrawing the tool into and from the first tool holding means and second grasp claw means for inserting and withdrawing the tool into and from the second tool holding means, each magazine pot being pivotal at the tool exchange position between a first exchange position where the magazine pot is parallel to the first tool holding means, and a second exchange position perpendicular to the first exchange position, where the magazine pot takes an attitude face to face with the second tool holding means, In accordance with another aspect of the present invention, there is provided an automatic tool change system in a combined machining lathe having a turret for holding tools, comprising: a plurality of magazine pots which rotatably move within a plane perpendicular to a rotation plane of the turret and insertably and withdrawably hold tools to be mounted onto the turret; and a tool change arm for replacing the tools between the magazine pots and first and second tool holding means which are mounted to the turret so as to be directed to a rotation axis direction of the turret and to the rotation plane direction of the turret, respectively, wherein the tool change arm includes first grasp claw means for inserting and withdrawing the tool into and from the first tool holding means and second grasp claw means for inserting and withdrawing the tool into and from the second tool holding means, each magazine pot being pivotal between a first exchange position where the magazine pot is directed in a direction within the rotation plane of the turret and a second exchange position where the magazine pot is directed in a direction of the axis of the turret.

In the automatic tool change system, with the rotation and planar movements of the tool change arm, the tool held by the magazine pot, which is indexed to the tool exchange position by the tool magazine and takes the first exchange position, is replaced with the tool held by the first tool holding means of the turret, indexed to a tool exchange position, by the first grasp claw means of the tool change arm.

Further, with the rotational and planar movements of the tool change arm, the tool held by the magazine pot, which is indexed to the tool exchange position and takes the second exchange position, is replaced with the tool held by the second tool holding means of the turret by the second grasp claw means of the tool change arm.

Hence, the tool change arm can be constructed with a simple configuration, and the weight of the tool change arm can be reduced, and thus the quick tool exchange operation can be performed

BRIEF DESCRIPTION OF THE DRAWINGS

The object, features and advantages of the present invention will become more apparent from the consideration of the following detailed description, taken in conjunction with the accompanying drawings, in which.

DESCRIPTION OF THE PREFERRED EMBODIMENTS

Figure 1:
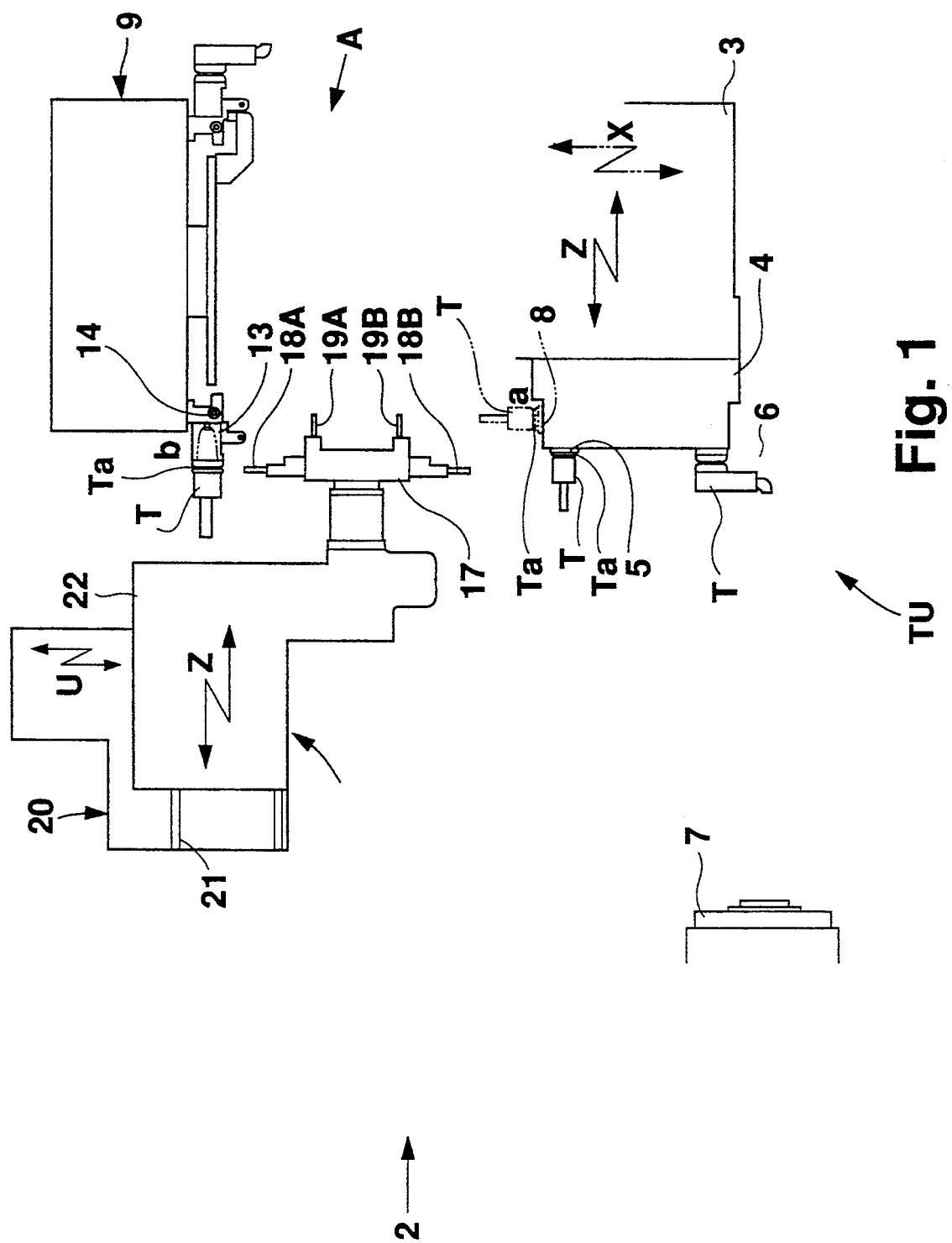
FIG. 1 is a top plan view of an essential part of a combined machining lathe with one embodiment of an automatic tool change system according to the present invention.

The present invention will now be described in connection with its preferred embodiments with reference to the accompanying drawings, wherein like reference characters designate like or corresponding parts throughout the views and thus the repeated description thereof can be omitted for brevity.

Figure 2:
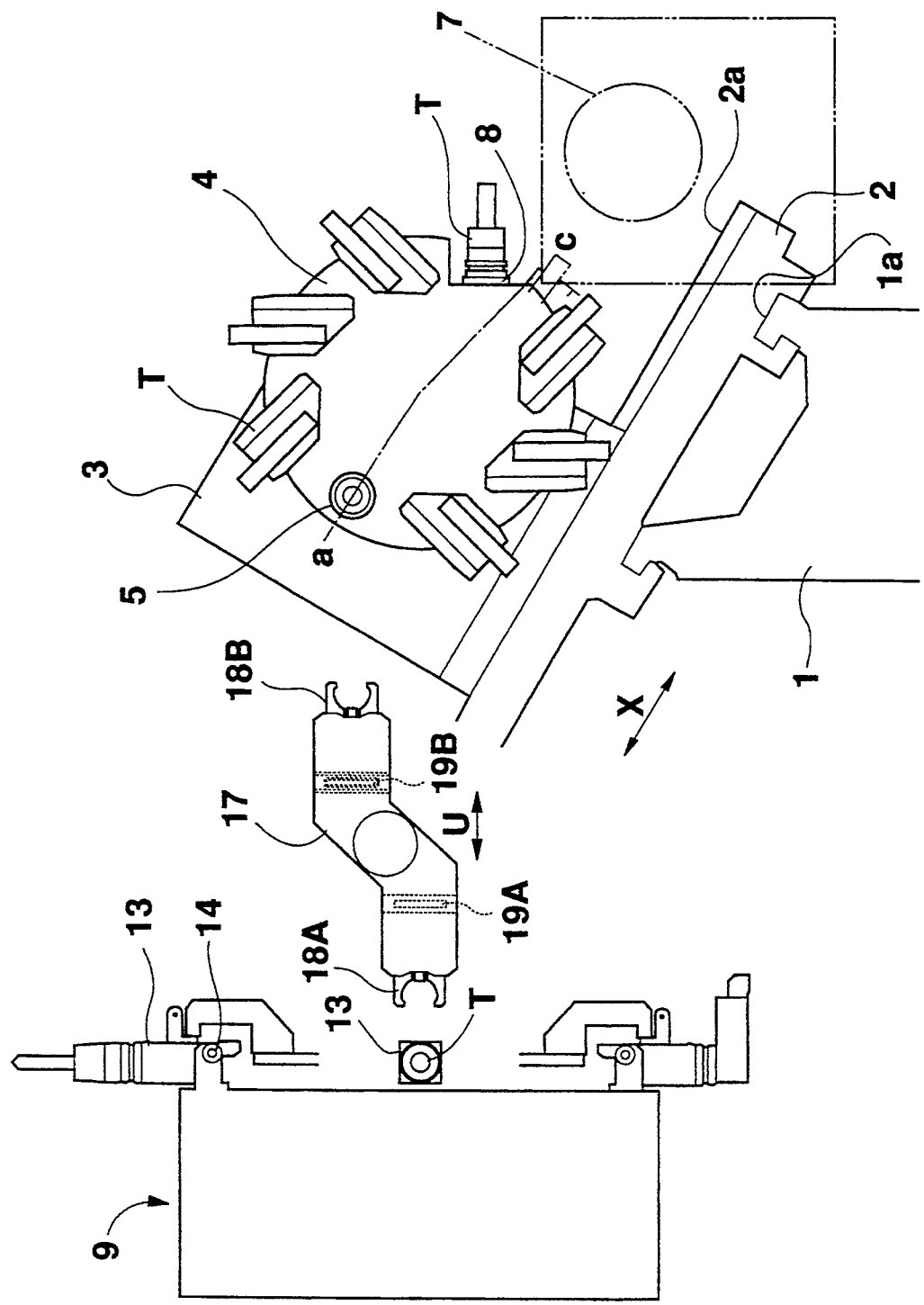
FIG. 2 is a side view of FIG. 1, viewed in the direction of an arrow 2 shown in FIG. 1.
Figure 3:
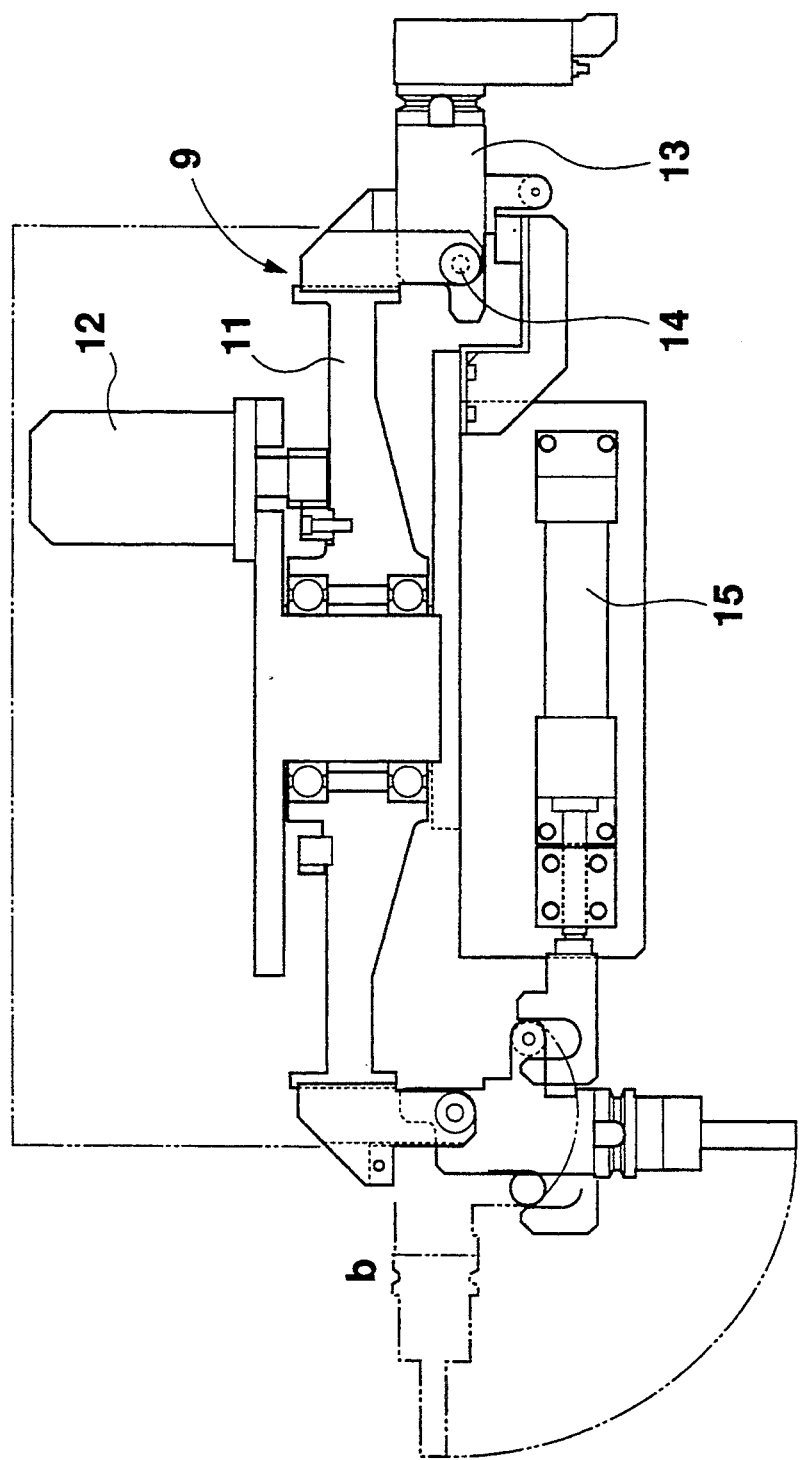
FIG. 3 is a cross section of a tool magazine, taken along the line 3—3 in FIG. 2.
Figure 4:
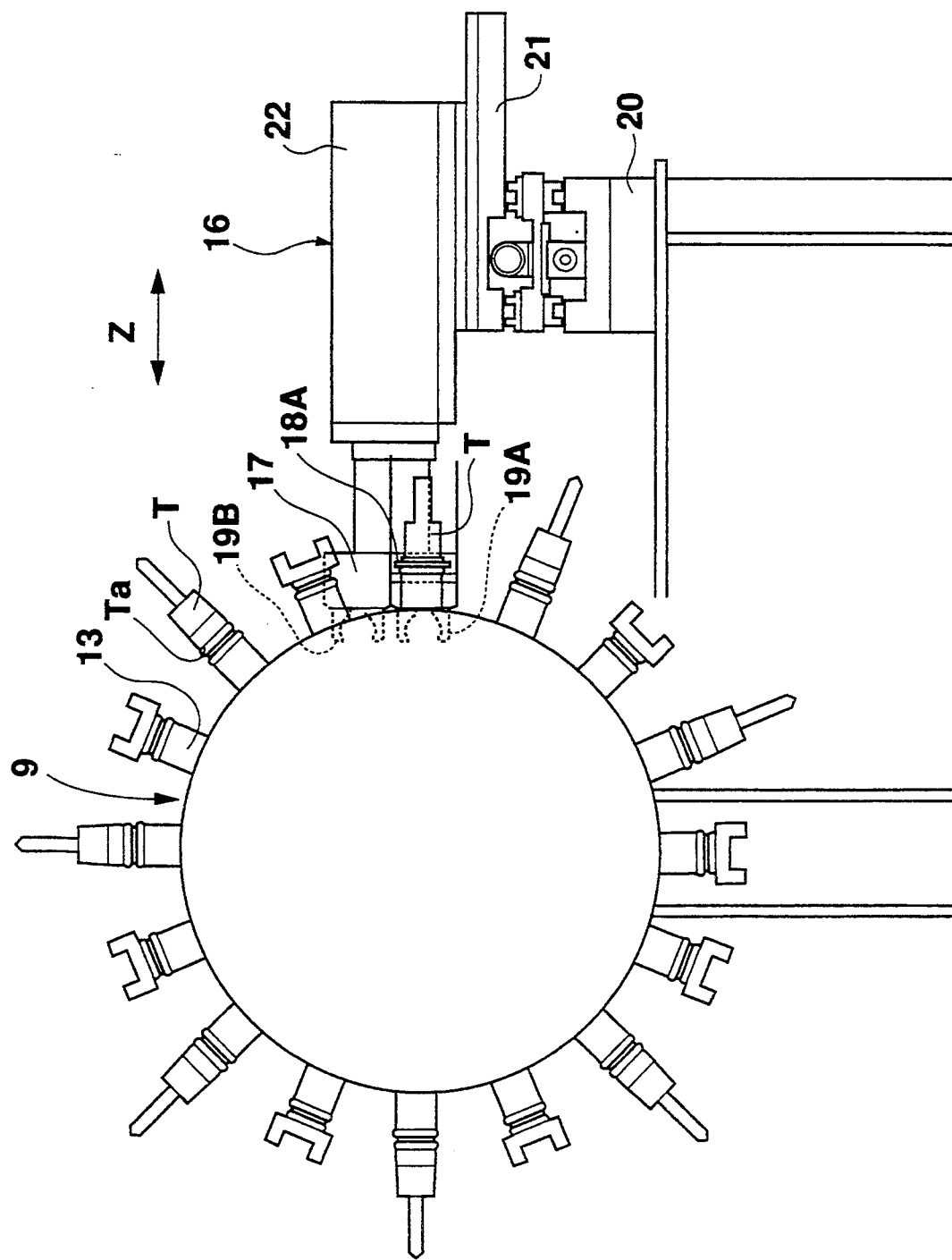
FIG. 4 is a rear view of the tool magazine shown in FIG. 2.

In FIGS. 1 and 2, there is shown a combined machining lathe having a turret lathe TU and an automatic tool change system A for automatically replacing tools of the turret lathe TU. The turret lathe TU includes a rotatable spindle 7 for gripping a workpiece and a turret 4 for holding a plurality of tools to be used for machining the workpiece. The turret 4 is supported by a tool head 3 which is rotated around an axis in the direction of a Z-axis parallel to the rotation axis of the spindle 7 while the tool had 3 can be indexed by an indexing machanism. A saddle 2 is movably placed and positioned through a first guide 1a in the direction of the Z-axis on a slant bed 1 installed on a floor. The first guide 1a inclines its front in the direction of an X-axis at an angle of 30°. The tool head 3 is movably mounted on a second guide 2a of the saddle 2 and can be positioned in the direction of the X-axis. On the end surface of the turret 4, a plurality of first tool holding means 5 and 6, directed to the direction of the rotation axis of the turret, that is, the Z-axis direction, are arranged at a certain interval in the peripheral direction of the turret 4. The first tool holding means 5 is capable of holding and rotating a tool T. In a notch of the periphery of the turret 4, a second tool holding means 8 opens, facing the direction perpendicular to the Z-axis direction, that is, the direction of the rotation plane of the turret. The tool holding means 5, 6 and 8 of the turret 4 are adapted to be indexed to a tool exchange position a on the rear side and a machining position c on the front side, which is a 210° or 150° rotation in the clockwise or counterclockwise direction away from the tool exchange position a, as shown in FIG. 2.

The automatic tool change system A includes a plurality of magazine pots 13 for insertably and withdrawably holding the tools T, a tool magazine 9 capable of indexing the magazine pots 13, and a tool change arm 17 for replacing the tools T between the magazine pots 13 and the tool holding means 5, 6 and 8. In the tool magazine 9, a disk 11 is rotatably driven around a rotation axis in the direction perpendicular to the rotation axis of the turret, that is, in a U-axis direction by a motor 12 via gear wheels and can be indexed. The magazine pots 13 are arranged on the periphery of the disk 11 at a certain interval. Each magazine pot 13 is pivotally mounted to the disk 11 via a pin 14. Each magazine pot 13 is adapted to pivot 90° from the direction toward the spindle side in the Z-axis direction to the direction toward the turret side in the U-axis direction, that is, from a first exchange position parallel to the first tool holding means 5 and 6 to the second exchange position directed face to face with the second tool holding means 8 by a fluid pressure cylinder 15, if necessary, only when each magazine pot 13 is indexed to a tool exchange position b.

The tool change arm 17 is rotatably mounted on an arm support 22. The arm support 22 is slidably mounted onto a fixed base 20 through a cross slide 21 so as to slide in the directions of the Z- and U-axes. To the tip of the arm support 22, the tool change arm 17 of the twin arm type is attached so as to pivot 180° around its rotation axis in the Z-axis direction between the tool exchange positions a and b. The tool change arm 17 can be positioned at two points in the Z-axis direction and four points in the U-axis direction by moving the arm support 22, as described hereinafter. The tool change arm 17 is provided with two holding claws 18A and 18B on both its ends for changing the tools T mounted on the end surface of the turret 17 and two holding claws 19A and 19B at locations inside the two holding claws 18A and 18B for changing the tools T on the side surface of the turret 17, and these holding claws are adapted to open and close.

Figure 5:
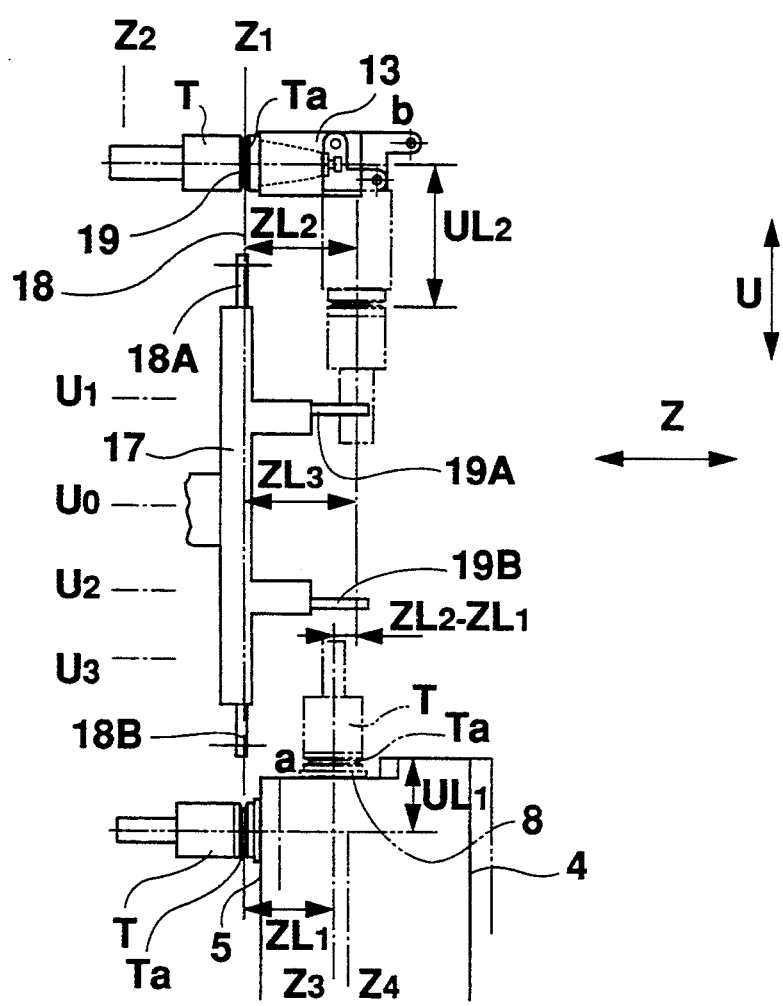
FIGS. 5 and 6 are schematic views showing a tool exchange operation of the tool change arm shown in FIG. 1.
Figure 6:
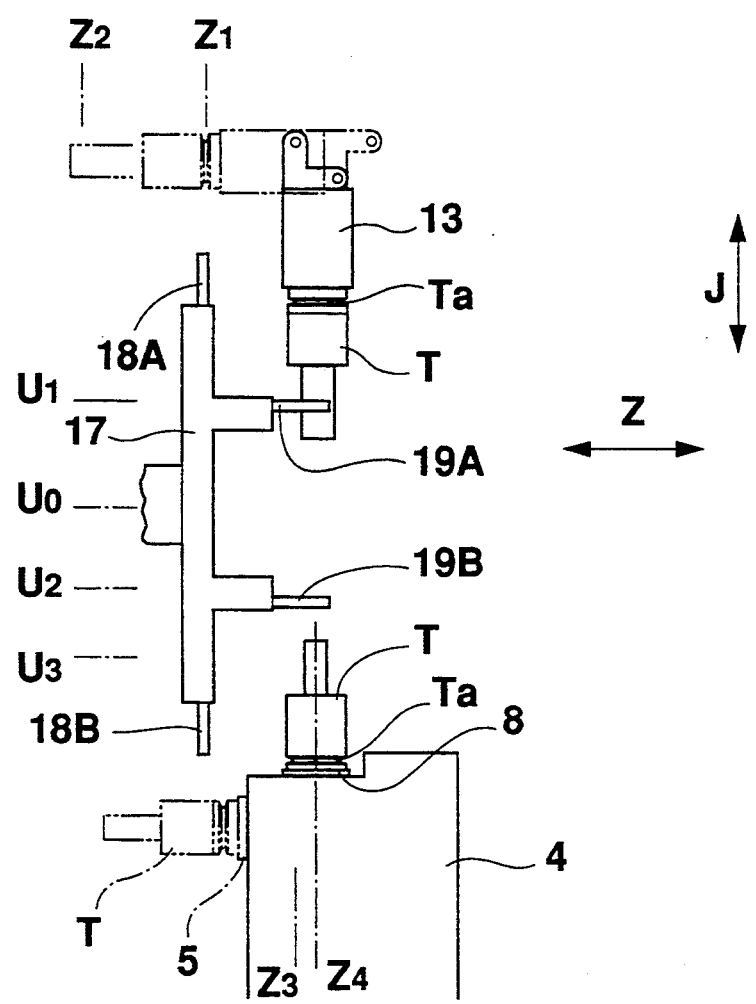
Figure 7B:
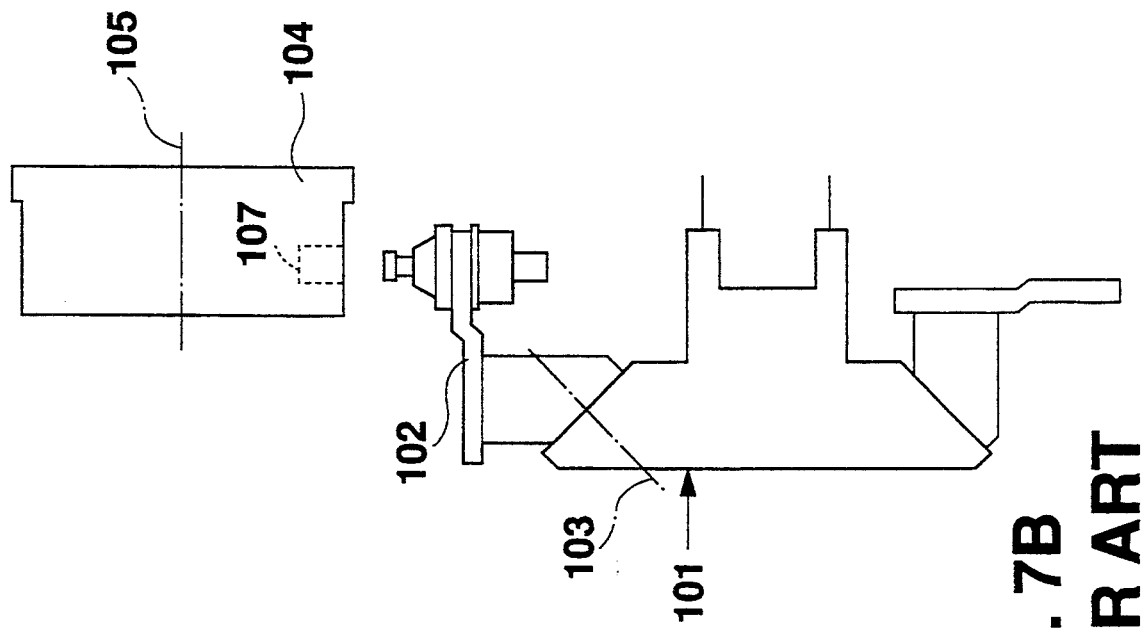
FIGS. 7A and 7B are schematic elevational views of a conventional automatic tool change system.
Figure 7A:
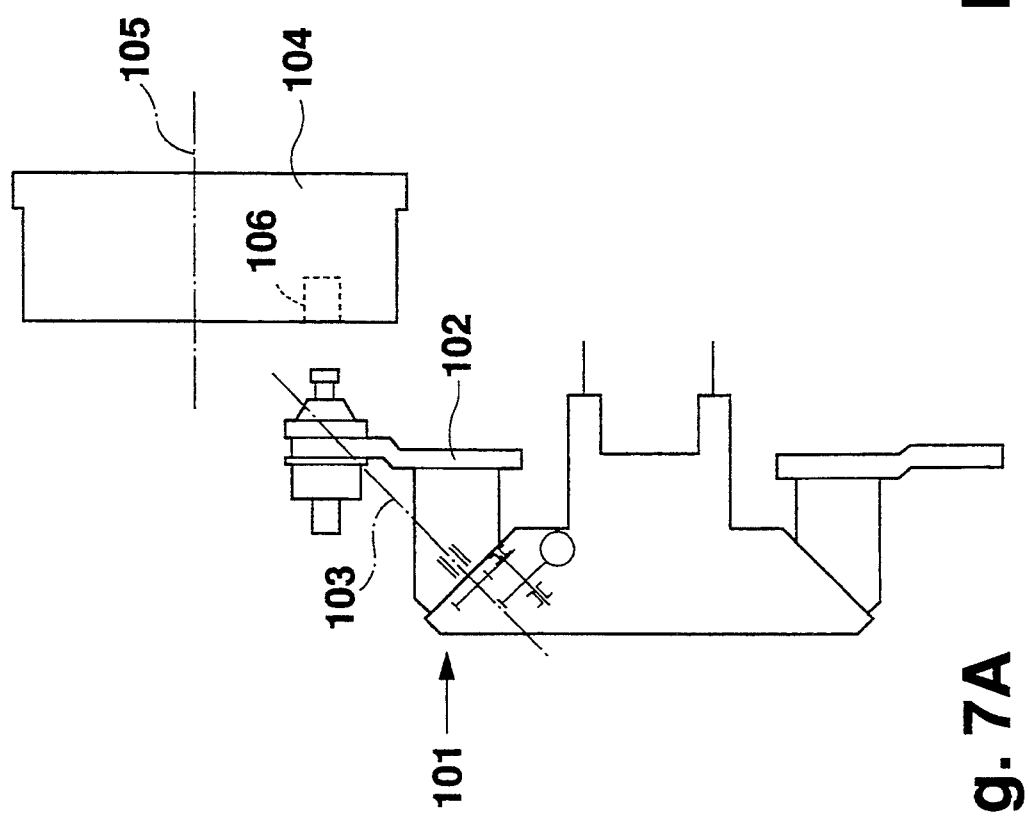

FIGS. 5 and 6 show the relation's between the positions of the magazine pots 13 and the tool holding means 5, 6 and 8 of the turret 4 and the position of the tool change arm 17 upon operation of the automatic tool change system A. The two positions of the tool change arm 17 in the Z-axis direction are: One position $Z_1$ where the centers of the holding grooves Ta of the tool T of the magazine pot 13 facing the spindle side in the Z-axis direction and of the tool T of the end surface of the turret 4 are aligned with the holding centers of the two holding claws 18A and 18B straight in the Z-axis direction, and another position $Z_2$ where a withdrawal of the tool T held is finished.

Further, the four positions in the U-axis direction. are: A parked and rotating position $U_0$ of the tool change arm 17, and a position $U_1$ closer to the magazine pot 13 and two positions $U_2$ and $U_3$ closer to the turret 4 with respect to the position $U_0$. By the movement of the tool change arm 17 from the position $U_0$ to the position $U_1$, the first holding claw 18A or 18B grasps the tool T held by the magazine pot 13 directed to the spindle side in the Z-axis direction or the second holding claw 19A or 19B is positioned at a location corresponding to the center of the holding groove Ta of the tool T held by the magazine pot 13 facing the turret side in the U-axis direction; by the movement from the position $U_0$ to the position $U_2$, the first holding claw 18A or 18B grasps the tool T held on the end surface of the turret 4; and further by the movement from the position $U_0$ to the position $U_3$, the second holding claw 19A or 19B is positioned at a location corresponding to the center of the holding groove Ta of the tool T held on the side surface of the turret 4.

In this case, the reason why the location is separated into the two positions $U_2$ and $U_3$ on only the turret side is that a distance $UL_1$ in the U-axis direction between the central axis of the tool T facing the Z-axis direction of the turret and the center of the holding groove Ta of the tool T directed in the U-axis direction is smaller than an equivalent distance $UL_2$ of the magazine pot 13 in order to reduce limitation of a machining range.

Further, it is desirable to set a distance $ZL_1$ in the Z-axis direction between the center of the holding groove Ta of the tool T directed in the Z-axis direction of the turret 4 and the central axis of the tool T directed in the U-axis direction as small as possible in order to reduce the restriction of the machining range in the same manner as the distance $UL_1$. Hence, the distance $ZL_1$ is set smaller than a distance $ZL_2$ in the Z-axis direction between the center of the holding groove Ta of the tool T directed in the Z-axis direction of the magazine pot 13 and the central axis of the magazine pot 13 turned to the U-axis direction by the angle of 90°. Accordingly, in order to cope with the second holding claw 19A or 19B of the tool change arm 17, it is required to shift the turret 4 at the distance $ZL_2-ZL_1$ in the right hand side direction. As a result, when the tool T directed in the U-axis direction on side surface of the turret 4 is to be replaced, since the tool head 3 should be positioned at the location at a distance $(ZL_3-Z_1)$ away to the opposite side to the spindle in the Z-axis direction, the Z-axis tool exchange position of the turret 4 adopts two positions such as a tool exchange position $Z_3$ of the tool directed in the Z-axis direction and a tool exchange position $Z_4$ of one in the U-axis direction.

Next, the operation of the automatic tool change system of the combined machining lathe according to the present invention will be described.

First, as shown in FIG. 5, the replacement of the tools directed in the Z-axis direction on the end surface of the turret 4 will be described. A tool T pre-selected as a next tool in the tool magazine 9 is indexed to the tool exchange position b and the tool change arm 17 parking at the position $U_0$, $Z_1$ moves toward the tool magazine in the U-axis direction and holds the next tool T at the position $U_1$ by the first holding claw 18A. The tool change arm 17 then moves to the position $Z_2$ toward the spindle side in the Z-axis direction, and withdraws the tool T from the magazine pot 13. Thereafter, the arm 17 moves through the position $U_0$ toward the turret 4 in the U-axis direction, to the position $Z_1$ on the opposite side from the spindle 7 in the Z-axis direction, successively moves toward the turret 4 in the U-axis direction, and holds the used tool T held on tile end surface of the turret 4 of the tool head 3 positioned in the Z-axis tool exchange position $Z_3$ at the position $U_2$ by the first holding claw 18B.

Next, the tool change arm 17 moves to the position $Z_2$ toward the spindle 7 in the Z-axis direction, withdraws tile tool T from the turret 4, moves to the position $U_0$ on the magazine side in the U-axis direction, and pivots itself in a range of 180° to replace the position of the used tool with that of the next tool.

The tool change arm 17 then moves to the turret side in the U-axis direction so as to make the next tool T grasped by the first holding claw 18A take a position concentric with the first tool holding means 5 of the turret 4 at the position $U_2$, and moves to the position $Z_1$ on the opposite side from the 'spindle in the Z-axis direction to insert the next tool T into the first tool holding means 5. Next, the tool change arm 17 moves to the position $U_0$ on the magazine side in the U-axis direction to remove the holding claw 18A from the next tool T, turning again to the position $Z_2$ on the spindle side in the Z-axis direction, then moves on the magazine side in the U-axis direction so as to make the used tool T held by the first holding claw 18B turn to the position concentric with the magazine pot 13 at the position $U_1$, and further moves to the position $Z_1$ on the opposite side to the spindle in the Z-axis direction to insert the used tool T into the magazine pot 13. Then, the tool change arm 17 moves onto the turret side in the U-axis direction to park at the position $U_0$.

Next, as shown in FIG. 6, the replacement of the tools directed in the U-axis direction on the side surface of the turret 4 will be described. First, a tool T preselected as a next tool in the tool magazine 9 is indexed to the tool exchange position b, and the tool change arm 17 parking at the position $U_0$, $Z_1$ moves to the position $Z_2$ toward the spindle 7 in the Z-axis direction, and the magazine pot 13 is pivoted in a range of 90° by the fluid pressure cylinder 15 to be directed toward the turret 4 in the U-axis direction. Next, the tool change arm 17 moves onto the magazine side in the U-axis direction to make the second holding claw 19A at the position $U_1$ aligned with the center of the holding groove Ta of the next tool T at the straight in the Z-axis. Thereafter, the tool change arm 17 moves to the position $Z_1$ to the opposite side to the spindle in the Z-axis direction, and grasps the next tool T by the second holding claw 19A.

Next, the tool change arm 17 moves to the position $U_0$ in the U-axis direction, withdraws the next tool T from the magazine pot 13, moves again to the position $Z_2$ toward the spindle 7 in the Z-axis direction, and moves to the position $U_3$ toward the turret 4 in the U-axis direction to make the second holding claw 19B straightly aligned in the Z-axis with the center of the holding groove Ta of the used tool T directed in the U-axis direction on the side surface of the turret 4 of the tool head 3 positioned in the Z-axis tool exchange position $Z_4$. Then the arm 17 moves onto the opposite side from the spindle 7 in the Z-axis direction, and grasps the used tool. T at the position $Z_1$ by the second holding claw 19B. Then, the tool change arm 17 moves to the position $U_0$ toward the tool magazine in the U-axis direction, withdraws the used tool T from the second tool holding means 8 of the turret 4, and pivots itself through 180° to replace the position of the used tool with that of the next tool.

The tool change arm 17 then moves to the position $U_3$ onto the turret side in the U-axis direction to insert the next tool T into the second tool holding means 8 of the turret 4, thereafter moves to the position $Z_2$ toward the opposite side from the spindle 7 in the Z-axis direction to remove the second holding claw 19A from the next tool T, moves to the position $U_0$ onto the magazine side in the U-axis direction, and moves onto the opposite side from the spindle 7 in the Z-axis direction to make the used tool T held by the second holding claw 19B take the position concentric with the magazine pot 13 at the position $Z_1$. Next, the tool change arm 17 moves to the position $U_1$ onto the magazine side in the U-axis direction to insert the used tool T into the magazine pot 13, and moves to the position. $Z_2$ toward the spindle 7 in the Z-axis direction to remove the second holding claw 19B from the used tool T.

Then, the tool change arm 17 moves to the position $U_0$ onto the turret side in the U-axis direction, and the magazine pot 13 is pivoted through 90° to be directed toward the spindle side in the Z-axis direction, and the tool change arm 17 moves onto the opposite side from the spindle in the Z-axis direction to park at the position $Z_1$.

According to the present invention, in a case where the positions of first tool holding means 5 and 6 in the Z-axis direction on the end surface of the turret 4 are different from each other and the Z-axis positions of the centers of the holding grooves Ta of the loaded tools T are misaligned with each other, three tool exchange positions of the tool head 3 in the Z-axis direction can be set to meet a requirement under these differences.

Further, according to the present invention, the moving direction of the tool change arm is not restricted to the U-axis direction and the tool change arm can be moved to any direction perpendicular to the Z-axis when the direction of the central rotation axis of the tool magazine is made coincident with the Z-axis.

Although the present invention has been described in its preferred embodiments with reference to the accompanying drawings, it it readily understood that the present invention is not restricted to the preferred embodiments and that various changes and modifications can be made by those skilled in the art without departing from the spirit and scope of the present invention.

What is claimed is:

1. An automatic tool change system in a combined machining lathe having a turret for holding tools, comprising:
    a plurality of magazine pots for insertably and withdrawably holding tools to be mounted onto the turret;
    a tool magazine for indexing the magazine pots to a tool exchange position;
    tool grasp means for inserting and withdrawing the tools into and from first and second tool holding means which are mounted to the turret so as to be directed to a rotation axis direction of the turret and to a rotation plane direction of the turret, respectively; and
    a tool change arm which is rotatable so as to rotatably move the tool holding means around an axis parallel to the rotation axis of the turret and is movable in a planar direction,
    the tool change arm replacing the tools between the magazine pots and the first tool holding means and between the magazine pots and second tool holding means through the rotational and planer movements of the tool change arm, wherein
    the tool grasp means includes first grasp claw means for inserting and withdrawing the tool into and from the first tool holding means and second grasp claw means for inserting and withdrawing the tool into and from the second tool holding means,
    each magazine pot being pivotal at the tool exchange position between a first exchange position where the magazine pot is parallel to the first tool holding means, and a second exchange position perpendicular to the first exchange position, where the magazine pot takes an attitude face to face with the second tool holding means.

2. The automatic tool change system of claim 1, wherein the magazine pot pivots through 90°.

3. The automatic tool change system of claim 1, wherein the first and second grasp claw means extend perpendicularly to each other.

4. An automatic tool change system in a combined machining lathe having a turret for holding tools, comprising:
    a plurality of magazine pots which rotatably move within a plane perpendicular to a rotation plane of the turret and insertably and withdrawably hold tools to be mounted onto the turret; and
    a tool change arm for replacing the tools between the magazine pots and first and second tool holding means which are mounted to the turret so as to be directed to a rotation axis direction of the turret and to the rotation plane direction of the turret, respectively, wherein
    the tool change arm includes first grasp claw means for inserting and withdrawing the tool into and from the first tool holding means and second grasp claw means for inserting and withdrawing the tool into and from the second tool holding means,
    each magazine pot being pivotal between a first exchange position where the magazine pot is directed in a direction within the rotation plane direction of the turret and a second exchange position where the magazine pot is directed in a direction of the rotation axis of the turret.

* * * * *